(12) United States Patent
Borguet et al.

(10) Patent No.: US 8,441,720 B2
(45) Date of Patent: May 14, 2013

(54) METHODS AND DEVICES FOR GENERATION OF BROADBAND PULSED RADIATION

(75) Inventors: Eric Borguet, Merion Station, PA (US); Oleksandr Isaienko, Elkins Park, PA (US)

(73) Assignee: Temple University of the Commonwealth System of Higher Education, Philadelphia, PA (US)

( * ) Notice: Subject to any disclaimer, the term of this patent is extended or adjusted under 35 U.S.C. 154(b) by 221 days.

(21) Appl. No.: 12/865,013

(22) PCT Filed: Feb. 27, 2009

(86) PCT No.: PCT/US2009/035434
§ 371 (c)(1),
(2), (4) Date: Aug. 24, 2010

(87) PCT Pub. No.: WO2009/108844
PCT Pub. Date: Sep. 3, 2009

(65) Prior Publication Data
US 2010/0321767 A1    Dec. 23, 2010

Related U.S. Application Data

(60) Provisional application No. 61/032,281, filed on Feb. 28, 2008.

(51) Int. Cl.
*G02F 1/39* (2006.01)
*G02F 1/35* (2006.01)

(52) U.S. Cl.
USPC .................. 359/330; 359/326; 372/22

(58) Field of Classification Search .......... 359/326–332; 385/122; 372/21–22
See application file for complete search history.

(56) References Cited

U.S. PATENT DOCUMENTS
2011/0013265 A1*  1/2011  Nishimura .................. 359/328

FOREIGN PATENT DOCUMENTS
CN            101211088 A  *  7/2008

OTHER PUBLICATIONS

Cerullo et al., "Ultrafast optical parametric amplifiers," Review of Scientific Instruments, vol. 74, No. 1, Jan. 2003, pp. 1-18.
Schriever et al., "Tunable 20 fs red pulses with up to 200 nJ energy from a 2 MHz Yb-doped fiber oscillator/amplifier system," Cleo '07. 2007 Conference on Lasers and Electro-Optics, May 2007, pp. 1-2.
Baltuska et al., "Visible pulse compression to 4 fs by optical parametric amplification and programmable dispersion control," Optics Letters, vol. 27, No. 5, Mar. 2002, pp. 306-308.
Cirmi et al., "Few-optical-cycle pulses in the near-infrared from a noncollinear optical parametric amplifier," Optics Letters, vol. 32, No. 16, Aug. 2007, pp. 2396-2398.

* cited by examiner

*Primary Examiner* — Daniel Petkovsek
(74) *Attorney, Agent, or Firm* — Ratner Prestia

(57) ABSTRACT

Methods and apparatus for non-collinear optical parametric ampliffication (NOPA) are provided. Broadband phase matching is achieved with a non-collinear geometry and a divergent signal seed to provide bandwidth gain. A chirp may be introduced into the pump pulse such that the white light seed is amplified in a broad spectral region.

29 Claims, 14 Drawing Sheets

METHODS AND DEVICES FOR GENERATION OF BROADBAND PULSED RADIATION

CROSS REFERENCE TO RELATED APPLICATIONS

This application is related to and claims the benefit of International Application No. PCT/US2009/035434 entitled METHODS AND DEVICES FOR GENERATION OF BROADBAND PULSED RADIATION filed Feb. 27, 2009, which was filed as a non-provisional of U.S. Provisional Application No. 61/032,281 entitled METHODS AND DEVICES FOR GENERATION OF BROADBAND PULSED RADIATION filed on Feb. 28, 2008, the contents of which are incorporated herein by reference.

STATEMENT REGARDING FEDERALLY SPONSORED RESEARCH

The invention described herein was made in the performance of work under DOE, Office of Basic Energy Sciences, Grant No. DE-FG02-05ER15638. The U.S. government may have certain rights in this invention.

FIELD OF THE INVENTION

The present invention generally relates to optical parametric amplification (OPA). In particular, the present invention relates to providing broadband pulsed signal and/or light in the near-infrared (NIR) and/or mid-infrared (MIR) region.

BACKGROUND OF THE INVENTION

There is an interest in the generation of intense, broadband, ultrashort, few-optical-cycle pulses of light in the near-IR and mid-IR regions of spectrum (about 1000-2000 nm and about 2000-5000 nm, respectively). Some promising applications include the generation of pulsed attosecond X-ray radiation via high-harmonic generation, coherent control of electron spin in semiconductors and ultrafast vibrational spectroscopy of interfaces by nonlinear optical processes (e.g., sum-frequency generation, second-harmonic generation, four-wave mixing). Other promising applications include two-dimensional IR spectroscopy with improved time-resolution, ultrafast bio-imaging with near-IR pulsed light radiation, broadband optical communication networks, coherent control of molecular vibrations, and state-selective laser driven chemistry.

SUMMARY OF THE INVENTION

Methods and apparatus for generation of broadband pulsed radiation in the near-infrared (NIR) and mid-infrared (MIR) portions of the spectrum with >2500 cm$^{-1}$ bandwidth, for example, are provided such that respective wavelength regions of about 1050-1450 nm and about 1800-3300 nm, for example, may be simultaneously covered. The method is based on optical parametric amplification (OPA) of NIR white light in a nonlinear crystal, such as potassium titanyl phosphate (KTiOPO$_4$, KTP), at a particular geometry of pump and white light seed beams. The method is extendable to other nonlinear optical materials.

In one embodiment, the present invention provides a non-collinear optical parametric amplification (NOPA) scheme for generation of tunable broadband optical pulses in the near-IR (about 1050-1450 nm) and mid-IR (about 1800-3300 nm) in a nonlinear optical crystal that is not periodically poled. In one embodiment, the pump beam pulses are not stretched, and the wavelength of the amplified signal may be defined by the portion of the chirped white-light seed that is overlapped with the shorter pump pulse. Tunability may be achieved by changing a time delay between the pump pulses and white-light seed pulses.

According to another embodiment, a NOPA scheme is provided for the generation of ultrabroadband optical pulses in the near-IR and mid-IR regions of spectrum covering simultaneously wavelength regions of about 1050-1450 nm and of about 1800-3300 nm, respectively. In this configuration, the pump pulses may be stretched in order to maximize the time overlap between the pump pulses and the white-light seed pulses, so that all wavelengths within the region of the signal phase-matched wavelengths may be amplified simultaneously.

According to another embodiment, stages of further amplification of the amplified broadband near-IR light pulses are provided for higher energy output of ultra-broadband light pulses in the near-IR and mid-IR parts of the spectrum. In this embodiment additional nonlinear optical crystals may be included, e.g., in a same geometry as the first crystal.

DETAILED DESCRIPTION OF THE INVENTION

Figure 1A:
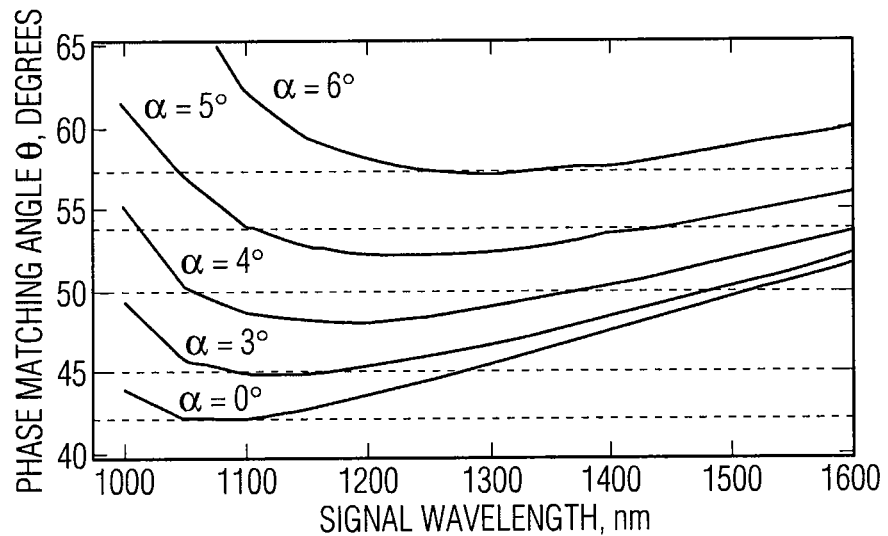
FIG. 1A is a graph illustrating various phase matching curves for OPA in KTP at different non-collinear angles between an 800 nm pump beam and seed beam.

Aspects of the present invention relate to methods and apparatus for the generation of ultra broadband light pulses in the near-IR and mid-IR spectral ranges with >2500 cm$^{-1}$ bandwidth and covering simultaneously wavelength regions of about 1050-1450 nm (about 9500-6900 cm$^{-1}$) and of about 3300-1800 nm (about 3000-5600 cm$^{-1}$), respectively. The method is based on type-II non-collinear optical parametric amplification (NOPA) of the near-IR portion of the white-light continuum seed. In an exemplary embodiment, self-phase modulation of femtosecond 800 nm pump pulses from a regenerative amplifier are used in a potassium titanyl phosphate (KTP) crystal with the seed beam being diverging at the KTP crystal. The proposed method may provide broadband infrared pulses supporting about a 10 fs duration, and thus may improve the time resolution of IR spectroscopy to about 10 fs.

The disclosed method for broadband OPA can be realized in at least two modes. In a first mode, the pump pulses are not stretched and the bandwidth of amplified white-light seed may be determined by using a white-light seed beam chirp. In the first mode, tuning of the generated near-IR signal pulses is achieved by adjusting a delay between the white-light seed pulses and the pump pulses. In a second mode, the pump pulses may be stretched so that a temporal overlap between the pump and white-light seed pulses is optimized. In the second mode, ultra-broadband near-IR signal and mid-IR idler pulses may be generated with >2500 cm$^{-1}$ bandwidth.

In accordance with the present invention, a bulk KTP crystal may be used, rather than a periodically poled crystal, which is typically more complex to manufacture.

For applications such as broadband vibrational spectroscopic studies and two-dimensional IR-spectroscopy, the generation of broadband ultrashort pulses in near- and mid-IR regions of the spectrum may be desirable. Self-phase modulation of a Ti:sapphire laser output and non-collinear optical parametric amplification (NOPA) in a β-barium borate (β-BaB$_2$O$_4$, BBO) crystal have been used to generate ultrabroadband carrier-envelope phase (CEP) stabilized pulses as short as 5 femtoseconds (fs) in the spectral region spanning from the visible (about 520 nm) to the near-IR (about 1300 nm) spectrum. One of the first reports of broadband generation in the approximately 2.1-2.6 μm region, with a full-width half-maximum (FWHM)-bandwidth of about 760 cm$^{-1}$, appeared as early as 1994. Recently, different methods have been disclosed regarding the generation of intense CEP-stabilized few-cycle pulses at wavelengths of about 1.5-2.1 μm. However, the bandwidths obtained by these methods did not exceed about 1500 cm$^{-1}$.

Non-collinear optical parametric wave-mixing is growing in interest as a promising approach to the generation of ultra-broadband radiation in the near-IR and mid-IR to provide bandwidths of about 200-250 cm$^{-1}$ or even greater than 2100 cm'. For example, a paper to Cirmi et al. entitled "Few-optical-cycle pulses in the near-infrared from a noncollinear optical parametric amplifier," in Optics Letters Vol. 32(16), pp. 2396-2398 (2007) (herein Cirmi et al.), proposed a scheme for extension of NOPA to the near-IR. In Cirmi et al., the experimental realization in a periodically-poled stoichiometric LiTaO$_3$ (PPSLT) resulted in the generation of ultra-broadband pulses simultaneously covering the approximately 1100-1600 nm band.

In the near-IR and mid-IR ranges, periodically-poled crystals are frequently used for broadband amplification. A periodically-poled crystal generally is constituted by a series of adjacent domains of monocrystalline nonlinear crystal that are alternatively oriented (poled) in opposite directions. By properly designing the properties (e.g. thickness) of each slab, the phase matching condition, described below, can be met and a broad spectrum of wavelengths may be amplified simultaneously. However, such techniques may impose problems with proper design of a crystal. Another shortcoming is a generally much higher cost of producing a periodically-poled nonlinear optical crystal as compared with monocrystalline optical crystal.

In addition, the use of periodically poled crystals for broadband OPA or optical parametric oscillation (OPO) generally implies a lack of tunability, because the period at which a nonlinear optical crystal must be poled, is defined for a certain region of wavelength, and which is necessarily limiting. It is typically difficult to correctly predict the period at which a particular nonlinear optical material is to be poled for a certain bandwidth and wavelength region.

In recent years, methods such as self-phase modulation of the output from a Ti:sapphire laser at central wavelengths of about 800 nm and non-collinear optical parametric amplification in BBO crystals have been shown to be powerful methods for generation of broadband optical pulses in the visible and near-IR spectral ranges (about 500-1300 nm). Self-phase modulation is generally a nonlinear optical process occurring when intense light pulses travel through dense media. At high intensities, the index of refraction of a medium begins to depend on the intensity of the light. Accordingly, new frequencies appear in the optical spectrum of the pulse and the pulse spectrum broadens. Although self-phase modulation is not completely understood theoretically at a detailed level, it is generally understood phenomenologically. For example, with self-phase modulation, sub-5 fs optical pulses were generated from a Ti:sapphire oscillator. However, such pulses typically lack an ability to be tuned.

OPA is a second-order nonlinear optical process which typically occurs in media lacking inverse symmetry, e.g. nonlinear crystals. It is a three-wave interaction between three beams, conventionally called a pump beam, a signal beam and an idler beam (see FIG. 1B). The three beams have the following respective angular frequency relation: $\omega_{pump} > \omega_{signal} > \omega_{idler}$ (or, respectively, in terms of wavelengths: $\lambda_{pump} < \lambda_{signal} < \lambda_{idler}$). During OPA, a high-intensity pump beam interacts with a low-intensity seed beam. As a result of the interaction, energy of the pump beam is transferred to the seed beam such that the intensity of the seed beam increases. In parallel, another complementary beam is formed (i.e. if the signal is the seed beam, the idler beam is formed and vice versa).

There are two conditions governing the OPA process. The first condition is a photon energy conservation: $\hbar \omega_p$, $\hbar \omega_s$, $\hbar \omega_i$, where $\hbar = 1.055 \cdot 10^{-34}$ J·s is the reduced Planck's constant and $\omega_p$, $\omega_s$, and $\omega_i$, are angular frequencies of the pump, signal and idler beams, respectively. The second condition is phase matching (i.e. a photon momentum conservation). The momentum of the pump photon is equal to the sum of the momenta of the signal and idler photons. Because momentum is a vector, the phase matching condition for the OPA process, in the general case, may be written in vector form as:

$$\hbar \cdot \vec{k}_p = \hbar \cdot \vec{k}_s + \hbar \cdot \vec{k}_i \quad (1)$$

where $\vec{k}_p$, $\vec{k}_s$, and $\vec{k}_i$ are wave vectors of the pump, signal and idler beams, respectively.

A value of the wave vector of a beam depends on the frequency of the beam and refractive index of the nonlinear optical medium $$|\vec{k}_m| = \frac{\omega_m \cdot n(\omega_m)}{c},$$

where m=pump, signal, or idler; $n(\omega_m)$ is the wavelength-dependent index of refraction for the corresponding beam and c is the speed of light. For this reason, the phase matching condition, on one hand, allows for tunability of the pair of the signal and idler beams (e.g. via angle tuning of a nonlinear optical crystal). On the other hand, the phase matching condition sets a limitation on the bandwidth of signal and idler beams that can be amplified simultaneously, which for collinear OPA is on the order of about 300-400 cm$^{-1}$. Several methods have been proposed and are currently used to increase the to bandwidth of optical parametric amplification.

In the visible range (about 500-750 nm), the most frequently used method is broadband optical parametric amplification of visible white light in a BBO crystal pumped at 395 nm in non-collinear geometry between the signal seed and the pump (BBO-NOPA). The BBO-NOPA makes phase matching (Eq. 1) possible over a broader is range of wavelengths by using group-velocity matching of signal and idler pulses. The non-collinear geometry allows for phase matching over a much broader wavelength range than collinear geometry. The group-velocity matching, in turn, allows the bandwidth of signal wavelengths that can be amplified simultaneously to be increased without angle-tuning the BBO crystal. In parallel with amplified broadband signal, the near-IR idler beam in the range of about 900-1300 nm is generated, but it does include an inherent spatial dispersion (to maintain the phase-matching condition).

According to an embodiment of the present invention, broadband amplification of short pulses with greater than 2500 cm$^{-1}$ of bandwidth in the near-IR (about 1050-1450 nm) is provided by using type-II NOPA of white light (WL) pumped at 800 nm in a potassium titanyl phosphate (KTP) crystal, a material which has not been previously identified for ultra-broadband generation in the IR region. One advantage of this method is the use of a monocrystalline material, which makes predictive calculation more straightforward than for periodically-poled crystals. By making the seed beam divergent at the crystal, it is possible to expand the signal-idler group-velocity matching over a broad frequency range. In addition, the white-light chirp may be compensated by appropriately stretching the pump pulses and amplifying the entire phase-matched bandwidth at once.

Figure 1B:
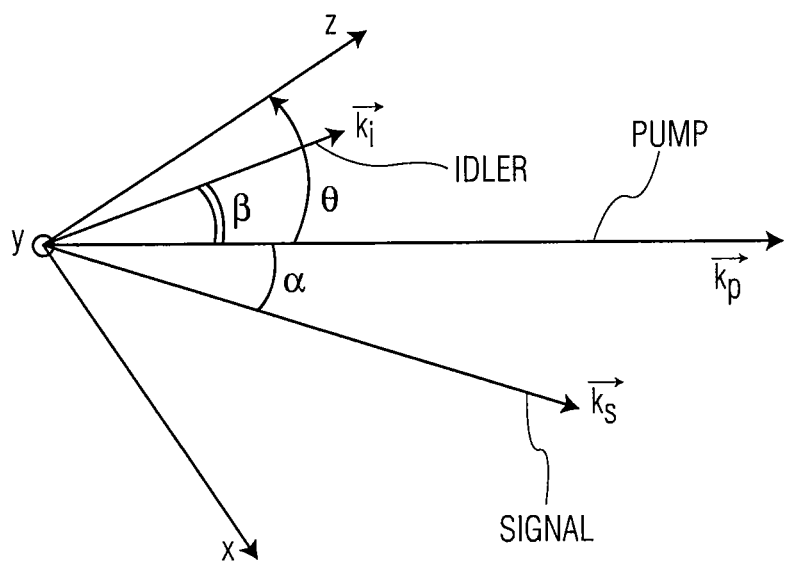
FIG. 1B is a diagram illustrating an internal geometry of three interacting beams (a signal beam, an idler beam and a pump beam) with respect to crystal axes.

Referring now to FIGS. 1A and 1B, phase matching curves for OPA and an internal geometry of interacting beams in crystal are shown. FIG. 1A shows phase matching curves for OPA in KTP (for the xz-plane, type II, (e)-signal+(O)-idler= (O)-pump) at different non-collinear angles between the pump optical pulses and the near-IR signal seed optical pulses. FIG. 1B shows the corresponding geometry of the three interacting beams, i.e. the pump beam, the signal beam and idler beam, inside the KTP crystal, with notations for non-collinear angles between 1) the pump and the signal ($\alpha$) and 2) the pump and the idler ($\beta$). The optical axes x, y and z of the KTP crystal are also shown. The phase matching angle $\theta$ is defined herein as the internal angle between the direction of the wave vector of the pump and the optical axis z. In FIG. 1B, z represents the optical axis, $\alpha$, $\beta$ represent the respective signal-pump and idler-pump non-collinear angles, and $\theta$ represents the phase matching angle between the pump beam and the optical axis.

In FIG. 1A, the phase matching curves for non-collinear type-II interaction (o-pump→o-idler+e-signal) in the xz-plane of a KTP crystal pumped at 800 nm, at different fixed signal-pump non-collinear angles (FIG. 1) were calculated using a public domain software package (SNLO) available from AS Photonics of Albuquerque, N. Mex., USA. The geometry of interacting beams inside the crystal and the corresponding internal angles are shown in FIG. 1B. Although there is no single phase matching curve with a broad flat region (as, e.g., for BBO in the visible region), at $\alpha \approx 4$-$5°$ it is possible to phase match a set of curves' corresponding to different seed-pump non-collinear angles. This behavior suggests that it is possible to amplify a large bandwidth of signal frequencies if the signal seed beam is not collimated but rather diverges in the crystal. This approach is important as it extends the methods of NOPA condition selection.

For example, according to an exemplary approach, the range of materials in which broadband generation may be achieved may be extended. According to conventional approaches, NOPA is possible in materials which, at a particular seed-pump non-collinear angle, provide a phase matching curve that is flat in a broad signal wavelength region. For example, lithium niobate crystal has a phase matching curve for a non-collinear angle alpha=2° (FIG. 12), which is flat in a range of about 1100-1600 nm. A similar behavior is illustrated for a potassium niobate crystal (FIG. 13), for alpha=2.5°. KTP, however, does not include this property (i.e. at different signal-pump non-collinear angles the phase-matching curves of the KTP-crystal are not flat in an ultra-broad spectral region (FIG. 1A)). Accordingly, NOPA in KTP, with a greater than 1000 cm$^{-1}$ bandwidth, would not typically be considered by conventional approaches, if a collimated seed beam was used. If the seed beam is divergent, as described in an exemplary embodiment of the present invention, it is possible to phase match a set of curves corresponding to different seed-pump non-collinear angles. As used herein, the term "divergent" is used to mean that the seed beam spreads as it approaches the crystal.

Figure 2:
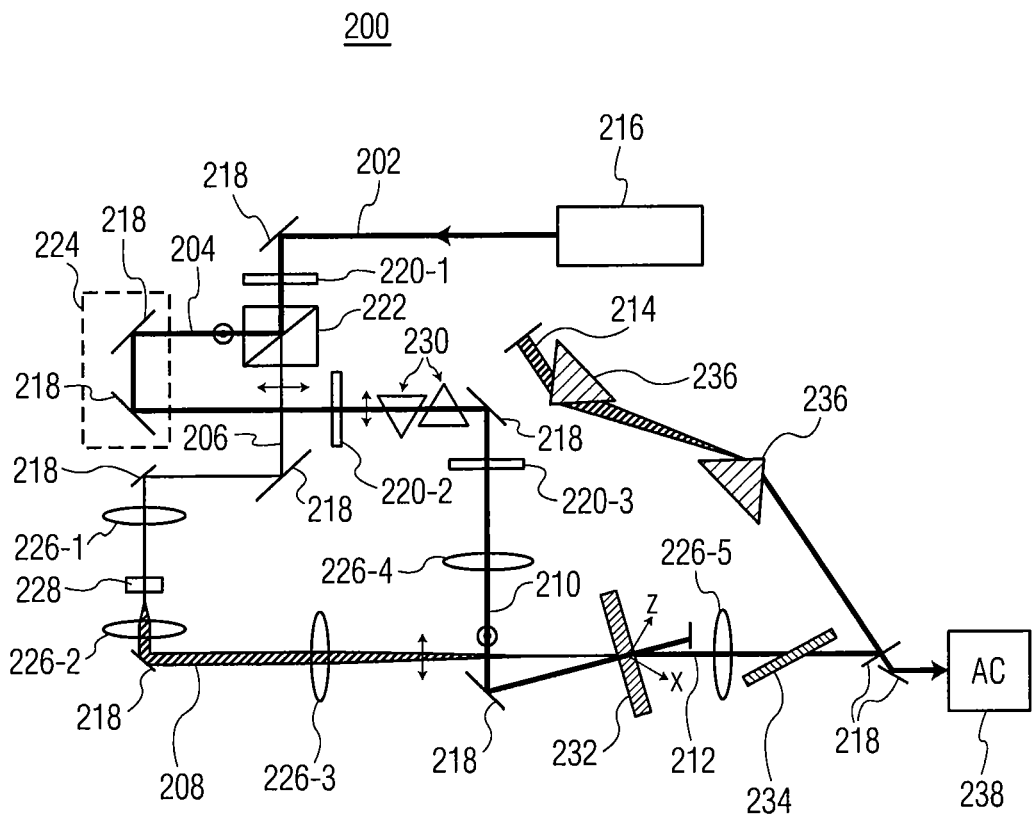
FIG. 2 is a block diagram illustrating an exemplary NOPA-KTP apparatus, according to an embodiment of the present invention.

Referring now to FIG. 2, an exemplary NOPA-KTP apparatus 200 is shown. Apparatus 200 includes half-wave plates 220, polarizer-beamsplitter (PBS) 222, delay stage 224, equilateral SF18-glass prisms 230, sapphire plate 228, lenses 226, 69.06°-apex angle fused silica prisms 236, filter 234 for blocking λ<1000 nm, mirrors 218 for directing each beam, and autocorrelator (AC) 238. Also shown in FIG. 2 is the zx-plane of a KTP crystal 232. In FIG. 2, double arrows and circles with dots represent polarization in the plane of, and perpendicular to, the drawing, respectively. In an exemplary embodiment, sapphire plate 228 is a 2 mm thick sapphire plate.

In an exemplary embodiment, a source 216 for the pump beam 202 is a Coherent Ti-sapphire oscillator and Alpha BMI-Coherent regenerative amplifier operating in fs-mode. In operation, 260 μJ of between about 100-200 fs 800-nm pulses 202 at a repetition rate of 1 kHz are split into two beams 204, 206 by a combination of half-wave plate 220-1 and PBS 222. For WL-seed generation, beam 206 of approximately 5 μJ is focused with a 100-mm lens 226-1 into sapphire plate 228 to form a WL beam 208. The WL beam is collimated with a 45-mm lens 226-2 and focused into KTP crystal 232 with a 250-mm lens 226-3. The remaining pump beam 204 (about 250 μJ) is passed through a system of half-wave plates 220 and prisms 230 for pulse stretching, to form pulse-stretched beam 210, in order to compensate for the chirp in WL-seed 208. By pulse stretching, all of the signal wavelengths in the phase matched band may be amplified.

In an exemplary embodiment, two equilateral SF18 prisms 230 (with a face size of 25 mm) oriented at Brewster's angle with respect to the pump beam 204 are used to stretch the pump pulses 204. The adjacent faces of the two prisms 230 are provided parallel to each other. Half-wave plate 220-2 produces a p-polarized pump beam at the prism surfaces, and half-wave plate 220-3 rotates the pump polarization to ordinary for parametric amplification in the KTP-crystal 232. The insertion of the prisms 230 and distance between them were adjusted to optimize the duration of stretched pulse 210. The pump pulse width was measured by selecting the beam 204 before the stretcher system and after it (i.e. stretched pulse 210) using AC 238 with a 1-mm BBO crystal.

After stretching, the stretched pump beam 210 is focused into KTP crystal 232 with a 300-mm lens 226-4. The power of the pump 210 right before KTP 232 is about 150 mW (the approximate 40% losses may be due to reflections at surfaces of the optics), and the focal point is adjusted to be about 4 cm behind crystal 232. The estimated pump pulse intensity is about 270 GW/cm$^2$.

In an exemplary embodiment, KTP crystal 232 is 2-mm thick and is cut at θ=42°, φ=0°. The external angles of incidence for pump and seed beams 210, 208 are 12° and 18.8°, respectively. After taking into account refraction at the crystal surface, the internal phase matching angles for the pump and seed beams 210, 208 were calculated to be 48.8° and 52.6°, respectively, and α was calculated to be about 4.0°. The amplified signal 212 is collimated with a 250-mm lens 226-5 and compressed in a fused-silica prism pair 236 (which acts as a compressor) with about 24 cm inter-prism separation, to form compressed amplified signal 214.

Figure 3A:
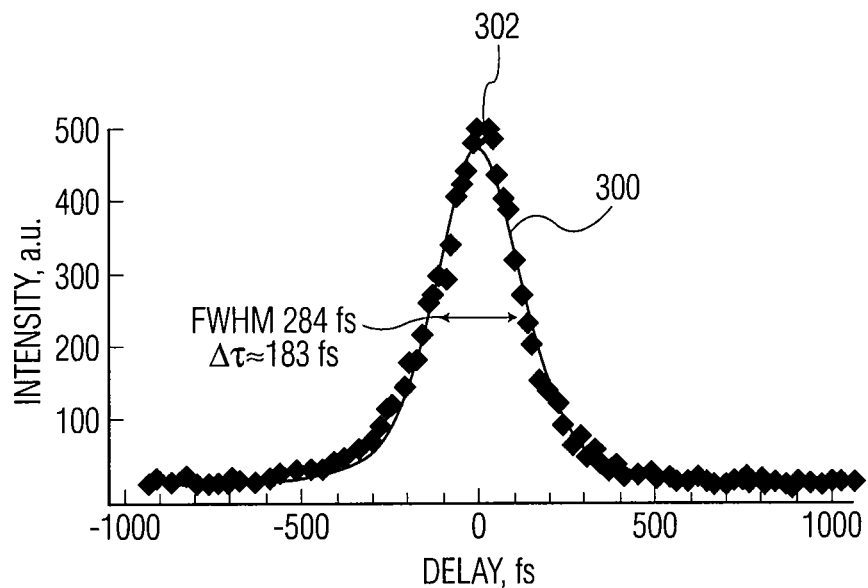
FIGS. 3A and 3B are graphs illustrating an autocorrelation of a pump pulse before and after a pulse stretcher, respectively.
Figure 3B:
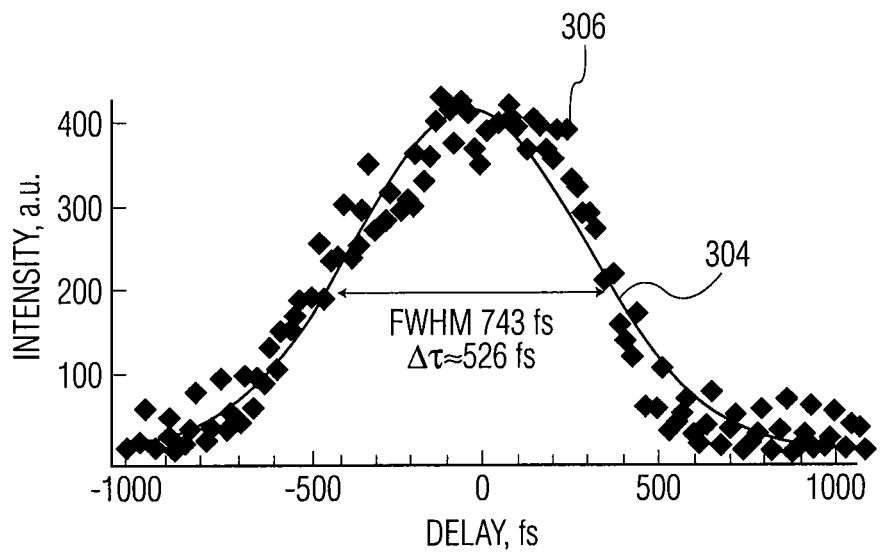

Referring to FIGS. 3A and 3B, the graphs of autocorrelations before and after a pulse stretcher are shown. In particular, FIG. 3A shows the autocorrelations 302 of the pump optical pulses 204 (FIG. 2) right after PBS 222; and FIG. 3(b) shows the autocorrelations 306 of the pump optical pulses 210 right after passing through the zo system of half-wave plates 220-2, 220-3 and SF18-prisms 230. Curves 300 and 304 (in respective FIGS. 3A and 3B) represent respective Gaussian curves fitted to the experimentally obtained autocorrelations 302, 306 of the 800 nm pump pulses.

The autocorrelation measurements of the pump pulsewidth before and after the system of half-wave plates 220-2, 220-3 and SF18 prisms 230 (FIG. 2) showed that the two SF18 prisms 230 provide enough group-velocity dispersion to stretch the approximately 12 nm broad 800 nm pulses from about 180fs to greater than 500fs. It is contemplated that the feature shown at about 1600 nm may be due to imperfect filtering of the 800-nm seed component.

Spectra of the amplified signal were acquired indirectly by recording second harmonic (SH) spectra of the signal reflected from a polycrystalline ZnSe-crystal with a charge coupled device (CCD) spectrometer (BWTEK, model BRC111A). The SH-spectra were processed by removing a background signal, taking the square root of the intensity (assuming that at each wavelength the intensity of SH is proportional to the square of the fundamental), and then doubling the wavelength scale.

Figure 4:
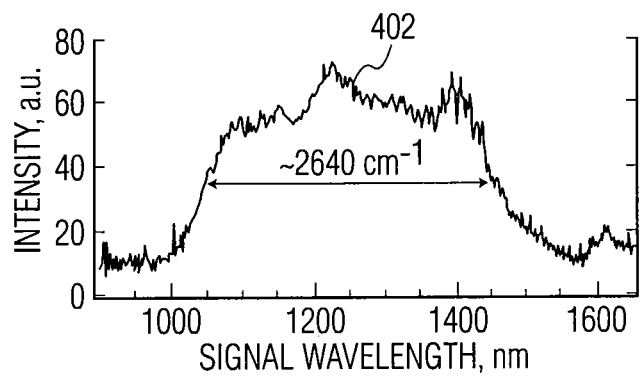
FIG. 4 is a graph illustrating a typical spectrum of the full-bandwidth NIR-signal derived from a second harmonic (SH) spectrum of an amplified signal off a ZnSe crystal surface.

Referring to FIG. 4, a typical spectrum 402 of the NIR-signal in full-bandwidth mode of NOPA shows a FWHM of about 400 nm (about 2600 cm$^{-1}$ or about 78 THz), corresponding to a transform limited (TL) pulse width of about 7.1 fs as calculated by performing a Fourier transform of the signal pulse spectrum. The output power of the NIR-signal is about 3-4 mW in full-bandwidth operation, corresponding to >2% conversion efficiency.

If the signal spectrum 402 (FIG. 4) is compared with the phase-matching curves (FIG. 1A), it appears difficult to amplify white-light in the NIR over the experimentally measured bandwidth at any one fixed non-collinear angle between pump and seed. In order to explain the results, the divergence of the seed beam 208 (FIG. 2) at the KTP-crystal 232 may be considered. After collimation with lens 226-2, the seed beam 208 has a diameter of about 7 mm, providing a full-angle divergence of about 1.6° (when focused with a 250-mm lens) corresponding to the internal full-angle divergence of about 0.86°, so that α≈4.0°±0.43°, or α≈[3.5° . . . 4.4°].

Figure 5:
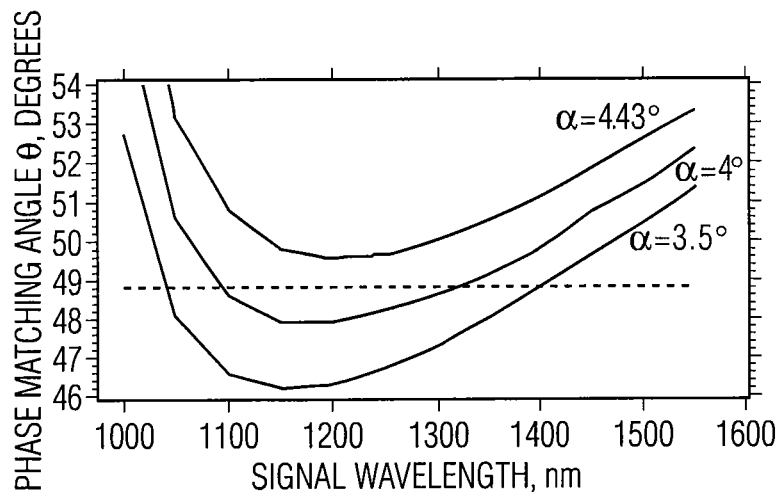
FIG. 5 is a graph illustrating various phase matching curves for NOPA in a KTP crystal at several different signal-pump non-collinear angles.

Referring now to FIG. 5, phase matching curves for NOPA in a KTP crystal are shown. The calculated phase matching curves at α=3.5°, 4.0°, and 4.4° are shown in FIG. 5. Also shown is the pump phase matching angle θ=48.8° (the internal full-angle divergence of the pump, <0.35°, is neglected). The boundaries of wavelength region where the signal seed is phase matched are determined by intersections of the θ=48.8° line with the α=3.5° curve. From FIG. 5, the signal may be amplified simultaneously within about 1050-1400 nm range, which is consistent with experimental results (FIG. 4).

Figure 6:
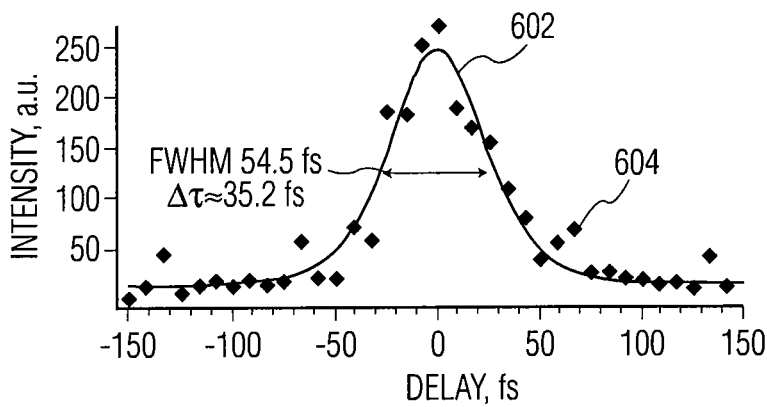
FIG. 6 is a graph illustrating an autocorrelation of a signal on a 30 μm BBO crystal.

Referring now to FIG. 6, an autocorrelation 604 of the signal beam on a 30 μm BBO crystal is shown, showing a FWHM 54.5 fs, corresponding to a sech$^2$-pulsewidth of about 35.2 fs, while the duration of a transform-limited (TL) pulse is about 8.5 fs as calculated by performing a Fourier transform of the signal pulse spectrum shown in FIG. 4. The full-width at half maximum of the autocorrelation 604 of the signal beam is about 55 fs corresponding to a pulsewidth of 35 fs assuming a sech$^2$-pulse shape. A corresponding Gaussian curve 602 fitted to the autocorrelation 604 is also shown in FIG. 6.

Figure 7:
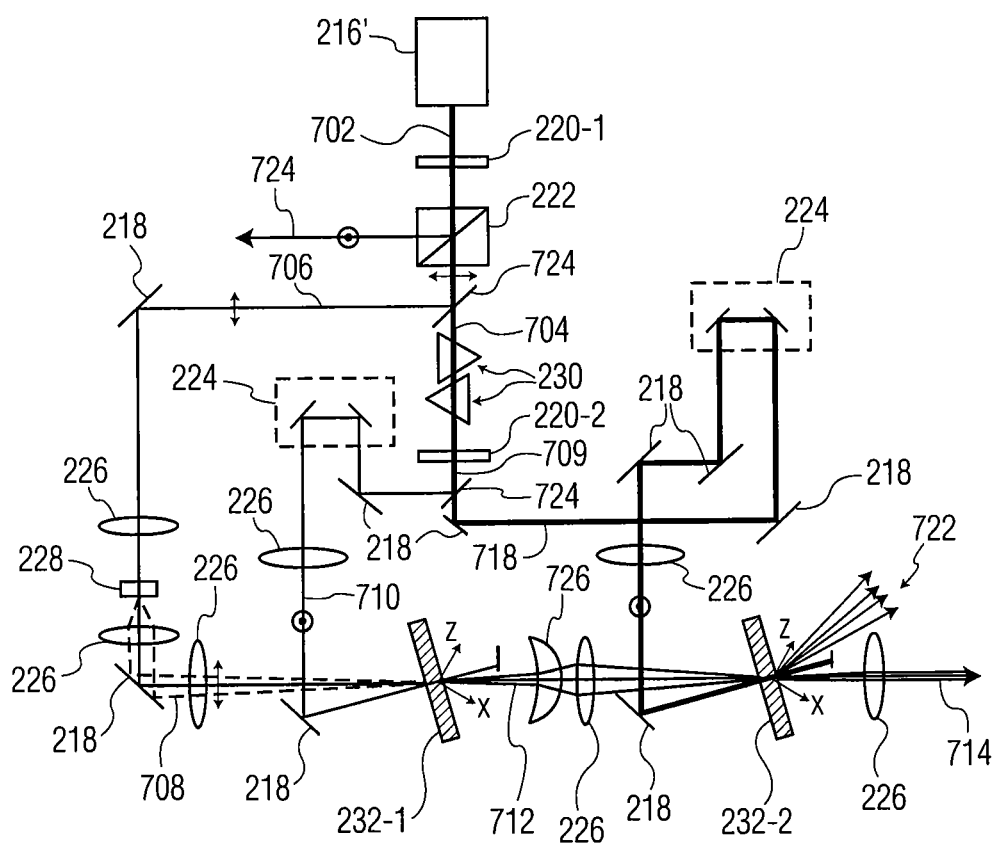
FIG. 7 is a block diagram illustrating an exemplary two-stage NOPA-KTP apparatus, according to another embodiment of the present invention.

FIG. 7 is a block diagram illustrating an exemplary two-stage NOPA-KTP apparatus 700 using two KTP crystals 232-1, 232-2, according to another embodiment of the present invention. Apparatus 700 is similar to apparatus 200 except that apparatus 700 includes two KTP crystals 232-1, 232-2, beamsplitters 724 and two delay stages 224. It is understood that common numerical references are used to represent like features.

In apparatus 700, pump beam 702 from source 216' is split into beams 704 and 706 by half-wave plate 220-1 and PBS 222. Beam 706 is focused into sapphire plate 228 to form a WL beam 708. The WL beam 708 is collimated and focused into KTP crystal 232-1. Pump beam 204 is passed through a system of prisms 230 and half-wave plate 220-2 for pulse stretching. The pulse stretched beam 709 is split into beams 710 and 718 via beamsplitter 724. Pulse-stretched beam 710 is delayed by delay stage 224 and applied to KTP crystal 232-1, in order to compensate for the chirp in WL-seed 708. Pulse-stretched beam 718 is delayed by another delay stage 224 and applied to KTP crystal 232-2.

Crystal 232-1 corresponds to KTP 232 (FIG. 2) and provides broadband OPA of the near-IR white-light seed 708, whereas crystal 232-2 is provided in the same geometrical configuration as 232-1 and provides further amplification of broadband near-IR signal pulses 712, via lenses 726 and 226 to form broadband signal 714. Lens 726 represents a diverging lens, e.g. a negative meniscus lens, a piano-concave lens, or a biconcave lens. Amplification of broadband near-IR signal pulses 712 obtained in KTP crystal 232-1 to about 15-µJ energy level in the KTP crystal 232-2 has been shown.

Source 216' is similar to source 216 except that source 216' provides pulses 702 of about 550 µJ. In an exemplary embodiment, beam 706 is about 10 µJ, beam 710 is about µJ, and beam 718 is about 100-150 µJ. In an exemplary embodiment, broadband signal 714 has a wavelength region of about 1050-1450 nm. It is understood that the energies of the pump pulses 702 shown in FIG. 7 used to produce the white-light seed beam 708 and to pre-amplify and amplify it in KTP-crystals 232-1 and 232-2, respectively are not limited to indicated values.

Additionally, it is possible to detect and measure the idler beam 722 (collimated with a $CaF_2$ 50-mm lens in an exemplary embodiment). The idler energy was measured at approximately 3-4 µJ and had a wavelength of about 18.-3.0 µm.

Experiments show that it is possible to provide further amplification of broadband near-IR pulses by adding more amplification stages (i.e. the addition of one or more KTP-crystals). This may also increase the available power of the mid-IR idler pulses. It should be also noted that although ~100-200 fs pump pulses were illustrated in the exemplary embodiments described herein, it is also possible to use longer pump pulses (~10-100 ps). The broadband signal pulses amplified by longer pump pulses may not be subject to spatio-temporal distortions which may be possible in non-collinear OPA using femtosecond pulses.

Figure 8:
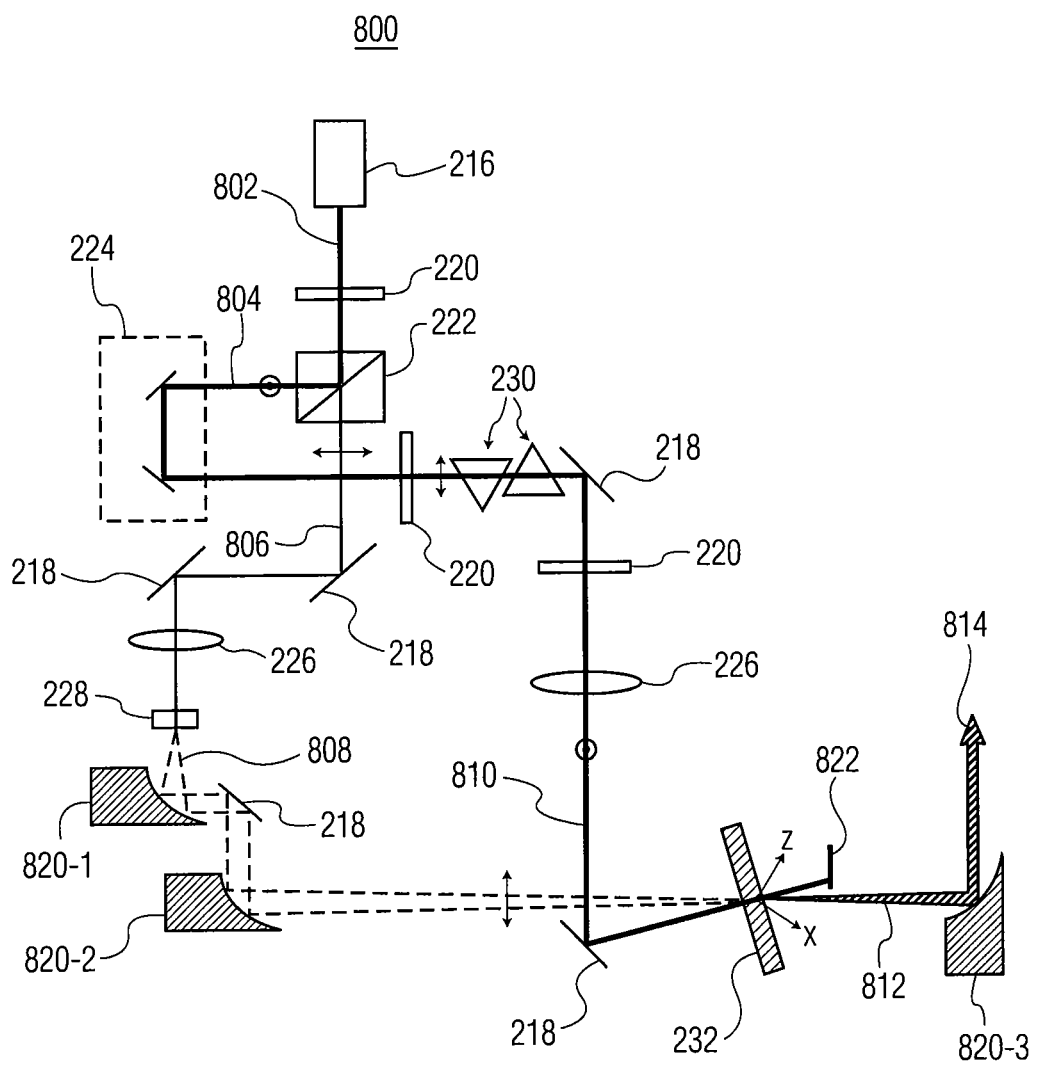
FIG. 8 is a block diagram illustrating an exemplary NOPA-KTP apparatus including curved mirrors, according to another embodiment of the present invention.

FIG. 8 is a block diagram illustrating an exemplary NOPA-KTP apparatus 800 including curved mirrors 820, according to another embodiment of the present invention. The apparatus 800 shown in FIG. 8 is essentially the same as the apparatus 200 of FIG. 2 except that parabolic off-axis mirrors 820 (or, in general, curved mirrors) are used, instead of lenses 226-2, 226-3 and 226-5. Parabolic off-axis mirrors 820 may remove a chromatic aberration, which is a drawback of using lenses for collimating and focusing broadband radiation. Chromatic aberration is an optical phenomenon typically caused by a dependence of refractive index of the lens material on wavelength. If broadband radiation (e.g., a white-light seed) is collimated with a lens 226, the collimated beam may have a radial distribution of wavelengths (with wavelengths increasing from the center of the beam to its edges) because of chromatic aberration. Chromatic aberration also influences focusing of the broadband beam. Different wavelengths may focus at different positions along the axis of the beam. Because reflection at the surface of a parabolic off-axis mirror follows the law of reflection the same way for different wavelengths, chromatic aberration may be removed.

In FIG. 8, parabolic off-axis mirror 820-1 is introduced for collimating the broadband white-light continuum 808 from sapphire plate 228. Parabolic off-axis mirror 820-2 is used to focus broadband white-light seed 808 into the nonlinear optical KTP crystal 232. Parabolic off-axis mirror 820-3 is used to collimate the amplified, broadband signal 812 after the KTP crystal 232, to form broadband signal 814. The geometry of the pump beam 810 and the seed beam 808 at the KTP crystal 232 is the same as that described with respect to FIG. 2. The focal lengths of parabolic off-axis mirrors 820-1 and 820-2 may be chosen such that the external divergence of the white-light seed beam 808 at the nonlinear optical crystal KTP 232 is appropriate for broadband non-collinear phase matching in the near-IR spectral region. Although a parabolic mirror 820 is described, it is understood that the apparatus 800 of FIG. 8 may be used with any other suitable type of curved mirrors. In an exemplary embodiment, broadband signal 814 has a wavelength region of about 1050-1450 nm.

Figure 9:
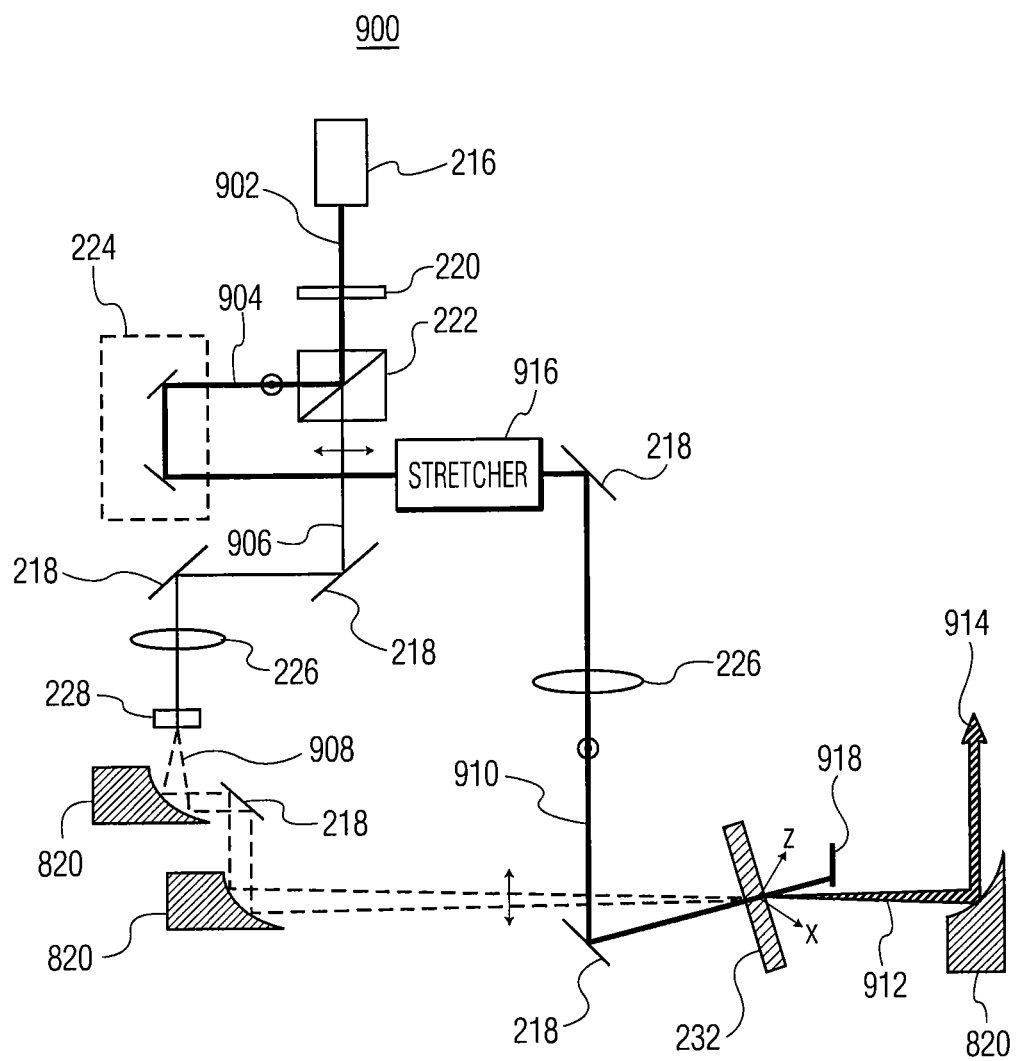
FIG. 9 is a block diagram illustrating an exemplary NOPA-KTP apparatus, according to another embodiment of the present invention.

FIG. 9 is a block diagram illustrating an exemplary NOPA-KTP apparatus 900, according to another embodiment of the present invention. The apparatus 900 shown in FIG. 9 is the same as the apparatus 200, 800 described with respect to FIGS. 2 and 8, except that a general pulse stretcher 916 is used instead of using two SF18 prisms 230 for stretching the pump pulses 904. The stretcher 916 may be any optical element that can provide enough group-velocity dispersion to stretch approximately 12 nm broad 800 nm pump pulses 904 from about 100-200 fs to stretched pump pulses 910 of about 600-700 fs. As one example, an approximately 10-20 cm plate of optical glass SF10 can be used as stretcher 916. In an exemplary embodiment, broadband signal 914 has a wavelength region of about 1050-1450 nm.

Figure 10:
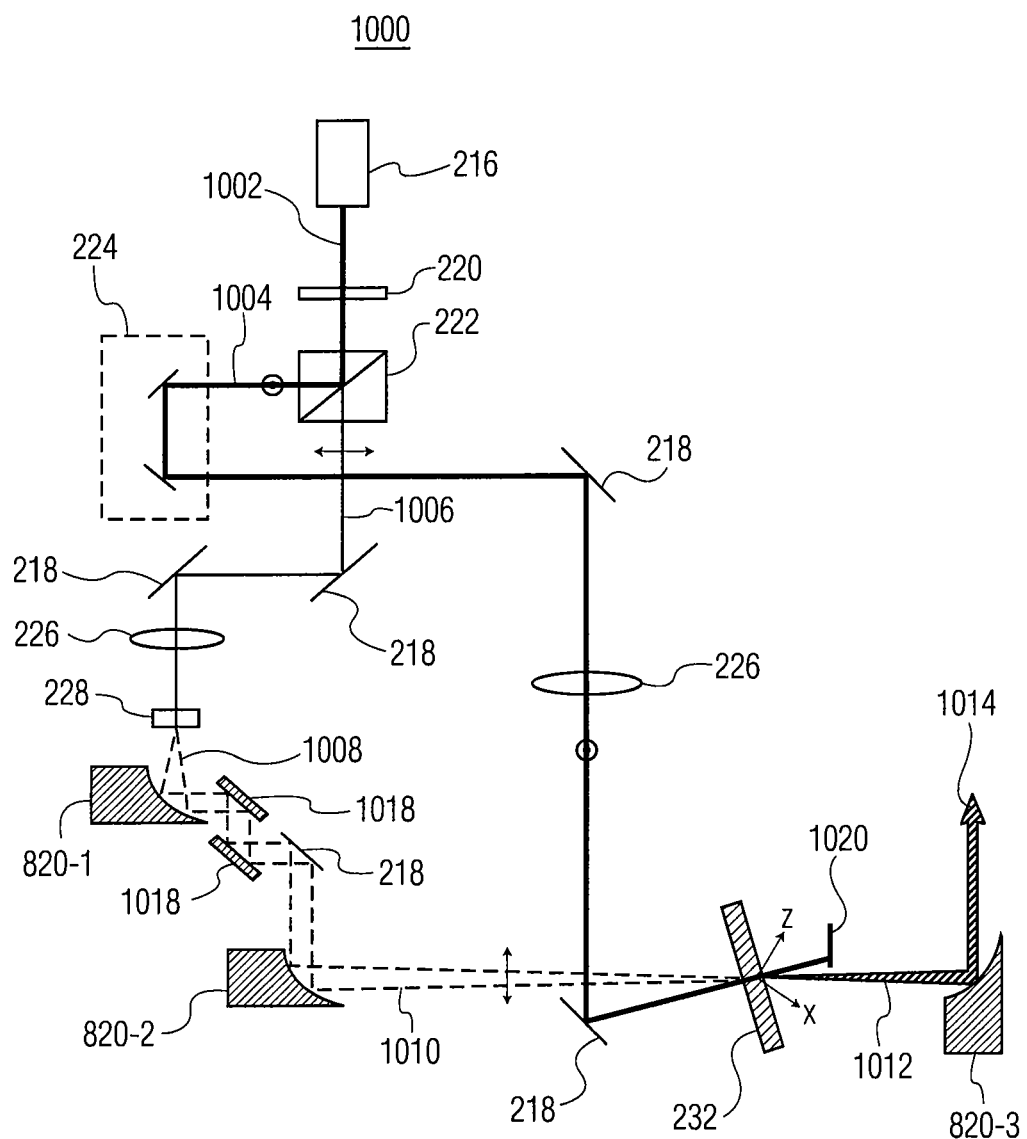
FIG. 10 is a block diagram illustrating an exemplary NOPA-KTP apparatus, according to a further embodiment of the present invention.

FIG. 10 is a block diagram illustrating an exemplary NOPA-KTP apparatus 1000, according to a further embodiment of the present invention. In FIG. 10, parabolic off-axis mirrors 820-1 and 820-2 are used, instead of the lenses 226 shown in FIG. 2, to collimate and focus the broadband white-light continuum seed 1008. In addition, the white-light seed pulses 1008 are compressed to the durations of the pump pulses 1004, rather than stretching the pump pulse 1004 duration to match it with the white-light seed chirp 1008 (as described with respect to FIG. 2). In FIG. 10, chirped mirrors 1018 zo are used to provide compression of the white-light seed 1008. It is understood that, in general, chirped mirrors 1018 may be designed for specified region of wavelengths, so that pulses in the corresponding wavelength regions obtain certain negative group-velocity dispersion after each reflection from the chirped mirror surface. By adjusting the number of bounces from the chirped mirrors 1018, the pulses 1008 may be compressed to a desired pulse duration. In an exemplary embodiment, broadband signal 1014 has a wavelength region of about 1050-1450 nm.

Figure 11:
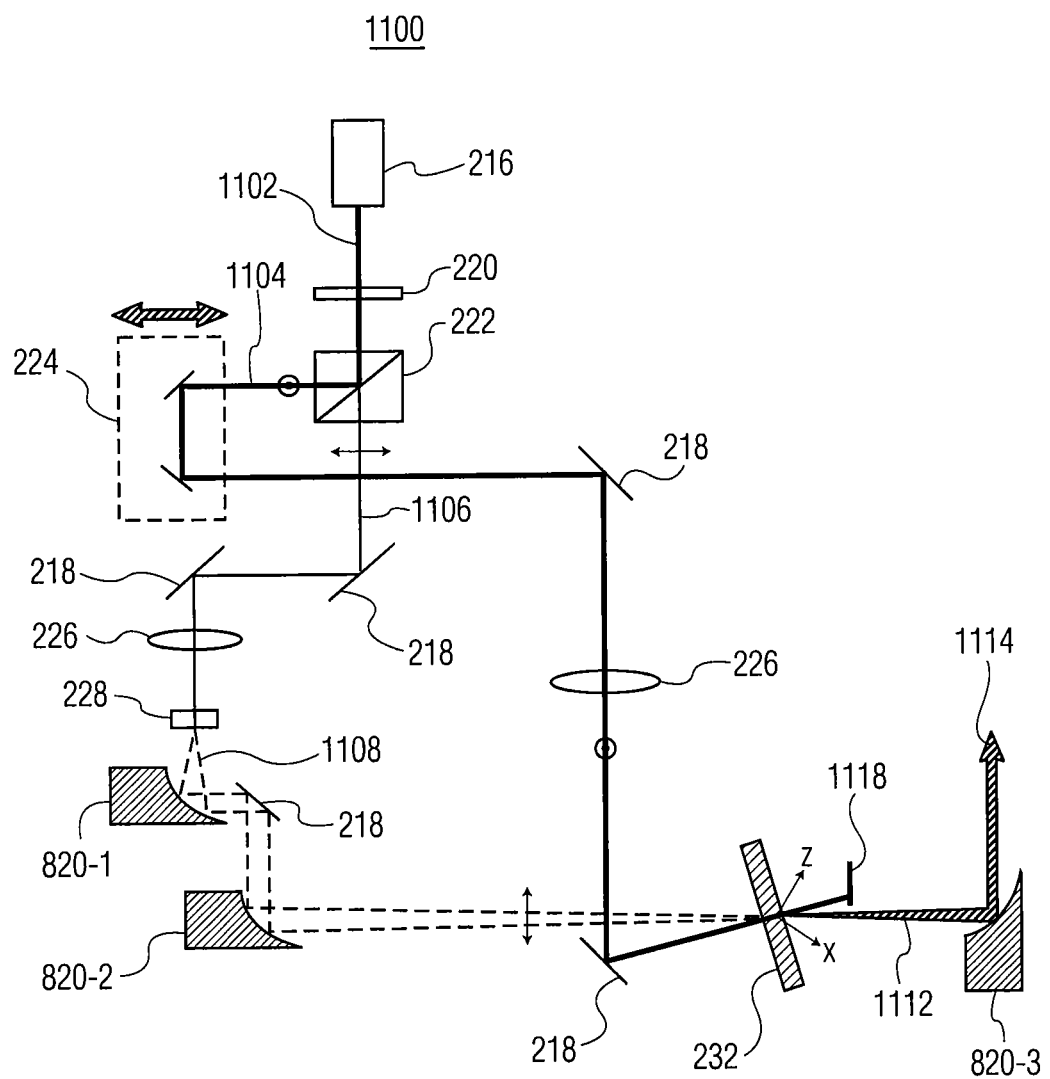
FIG. 11 is a block diagram illustrating an exemplary tunable NOPA-KTP apparatus, according to an embodiment of the present invention.

FIG. 11 is a block diagram illustrating an exemplary tunable NOPA-KTP apparatus 1100, according to an embodiment of the present invention. The apparatus 1100 shown in FIG. 11 represents an embodiment of tunable KTP-NOPA with one KTP-crystal 232. In contrast, the embodiments shown in FIGS. 2, 7, 8, 9 and 10 are designed for the production of ultra-broadband signal and idler pulses.

In this embodiment, the geometry of the white-light seed pulses 1108 and the pump pulses 1104 at the KTP crystal 232 is the same as described with respect to FIG. 2. Also, parabolic off-axis mirrors 820-1, 820-2 and 820-3 may be used to collimate the white-light seed 1108, focus it into the KTP crystal 232, and collimate the amplified signal 1112, respectively (as described with respect to FIG. 8) to form collimated amplified signal 1114. In addition, in previous embodiment, an optical element that is highly dispersive in the NIR region is included in the path of the white-light seed beam. However, in the apparatus 1100 of FIG. 11, there is no optical element for stretching the pump pulses 1104 and there is no optical element for compressing the white-light seed pulses 1108. In this embodiment, the wavelength of amplified signal 1114 depends on the temporal overlap of relatively short pump pulses 1104 (about 100-200 fs) and relatively long white-light seed pulses 1108 (about 600-700 fs). It is contemplated that to the relatively long pulsewidth of the white-light seed pulses 1108 is a consequence of the use of Si plates 228 (because Si is highly dispersive in the IR region) in the set-up, as shown in FIG. 11. It is contemplated that the white seed 1108 should be much less chirped without these Si plates 228. Tuning of the signal is achieved by shifting a time delay between the pump pulses and white-light seed pulses via delay stage 224. The is time delay tuning is shown in FIG. 11 with a double-sided arrow. As a result, tunable signal pulses 1114 with bandwidths of about 100 nm may be generated in a wavelength range of about 1050-1450 nm. It is understood that the bandwidth of the signal pulses 1114 may depend upon the chirp in the white-light seed pulse 1108.

Although a KTP crystal is described above, it is contemplated that other suitable zo (non-periodically-poled) nonlinear optical materials may also be used. For example, lithium niobate (LiNbO₃, LNB) or potassium niobate (KNbO₃, KNB) may be used. It is also contemplated that broadband generation with KNB and LNB crystals may be realized according to the embodiments described in FIGS. 8-11. Examples of phase matching curves produced using lithium niobate and potassium niobate nonlinear optical crystals are presented below.

Figure 12:
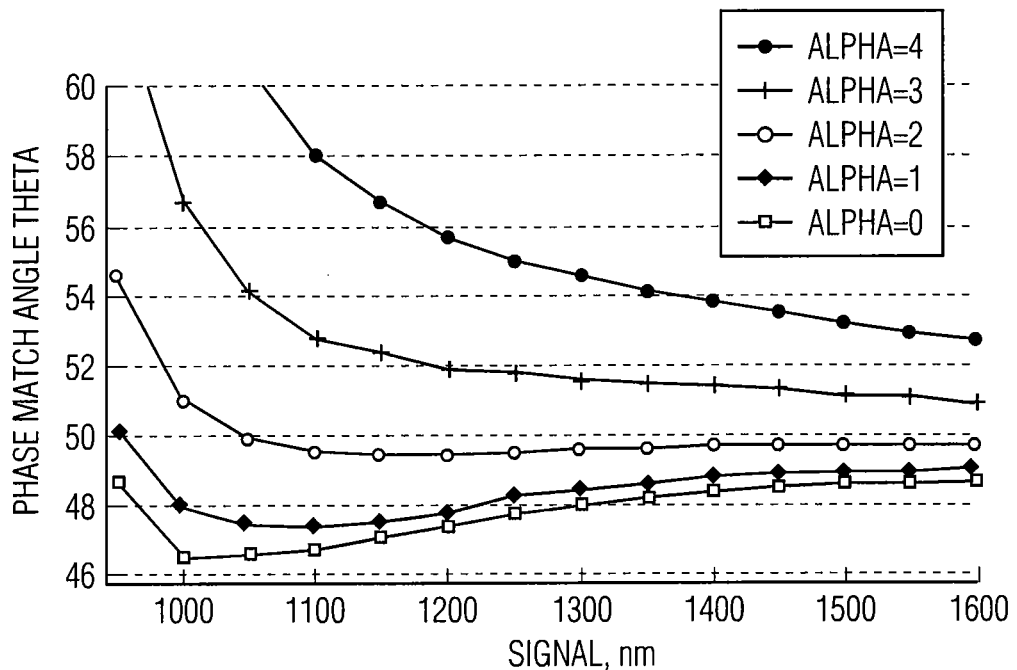
FIG. 12 is a graph illustrating various phase matching curves for different non-collinear angles α between pump and signal seed beams in a lithium niobate (LiNbO$_3$, LNB) non-linear optical crystal.

FIG. 12 shows calculated phase matching curves obtained for different non-collinear angles α between pump and signal seed beams in a lithium niobate (LiNbO₃, LNB) nonlinear optical crystal. In FIG. 12, phase matching is of type I (o-signal+o-idler=e-pump) and occurs in the (−Y,Z)-plane of the crystal)(φ=−90°. The geometry of the pump and signal beams is illustrated in FIG. 1B. In FIG. 12, the curve alpha=2° has almost no dependence of the phase match angle θ on the wavelength in the broadest region. Thus, FIG. 12 suggests that in order to amplify the near-IR signal seed in the broadest possible spectral region, the geometry of the pump and signal beams may be arranged such that the non-collinear angle between pump and signal is 2°, and the phase matching angle θ between the pump beam and the optical axis Z is 49.5°. It is possible that a signal beam may be generated using this configuration simultaneously covering wavelengths 1050-1600 nm (or 9520-6250 cm⁻¹), and an idler beam in the region of 3360-1600 nm (2970-6250 cm⁻¹)

Figure 13:
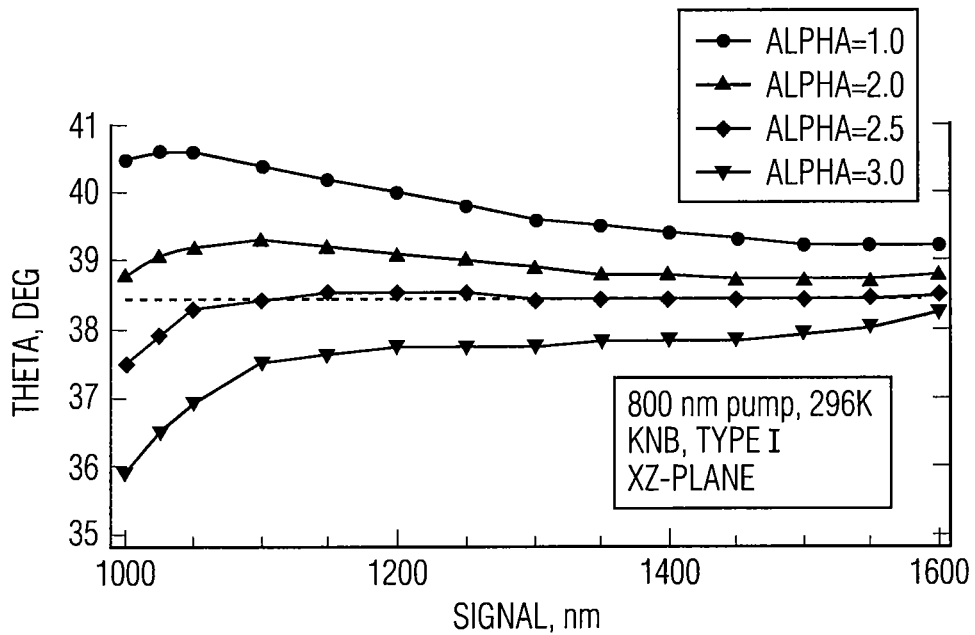
FIG. 13 is a graph illustrating various phase matching curves for different non-collinear angles α between pump and signal seed beams in a potassium niobate (KNbO$_3$, KNB) nonlinear optical crystal.

FIG. 13 shows calculated phase matching curves obtained for different non-collinear angles α between pump and signal seed beams in a potassium niobate (KNbO₃, KNB) nonlinear optical crystal. In FIG. 13, phase matching is of type I (o-signal+o-idler=e-pump) and occurs in the XZ-plane of the crystal (or, more generally, in the BC crystallographic plane of potassium niobate; axis assignment XYZ →c,a,b is used). The geometry of the pump and signal beams is illustrated in FIG. 1B. In FIG. 13, the curve alpha=2.5° has almost no dependence of the phase match angle θ on the wavelength in the broadest region. Thus, FIG. 13 suggests that to amplify the near-IR signal seed in the broadest possible spectral region in KNB crystal, the geometry of the pump and signal beams may be arranged such that the non-collinear angle between pump and signal is 2.5°, and phase matching angle θ between the pump beam and the optical axis Z inside the crystal is 38.5°. It is possible that a signal beam may be generated using this configuration simultaneously covering wavelengths 1050-1600 nm (or 9520-6250 cm⁻¹) and, concurrently, an idler beam in the region of 3360-1600 nm (2970-6250 cm⁻¹)

In addition, the results shown in FIGS. 12 and 13, namely, a flatness of phase matching curves with broadest regions of amplification, illustrates that it may not be necessary for the signal seed beam to be divergent at the nonlinear optical crystal (as compared to broadband phase matching in KTP-crystal, where the seed beam is typically divergent).

As indicated in Cirmi et al., non-collinear optical parametric amplification of broadband near-IR signal pulses in about the 1000-1600 nm range is possible in other nonlinear optical crystals with a 800-nm pump. These include lithium iodate (LiIO₃), lithium tantalate (LiTaO₃), as well as their periodically-poled modifications. The methods described in the present invention can also be applied to these materials. Also, as suggested by our calculations, this method may be able to extend the bandwidth of phase matching in the near-IR in such crystals as Potassium Titanyl Arsenate (KTA, KTIOAsO₄), Cesium Titanyl Arsenate (CTA, CsTiOAsO₄), Rubidium Titanyl Arsenate (RTA, RbTiOAsO₄), Rubidium Titanyl Phosphate (RTP, RbTiOPO₄), Potassium Aluminum Borate (KABO, K₂Al₂B₂O₇), Lithium Tetraborate (LB4, Li₂B₄O₇), and Yttrium Calcium Oxyborate (YCOB, YCa₄O(BO₃)₃).

Figure 14:
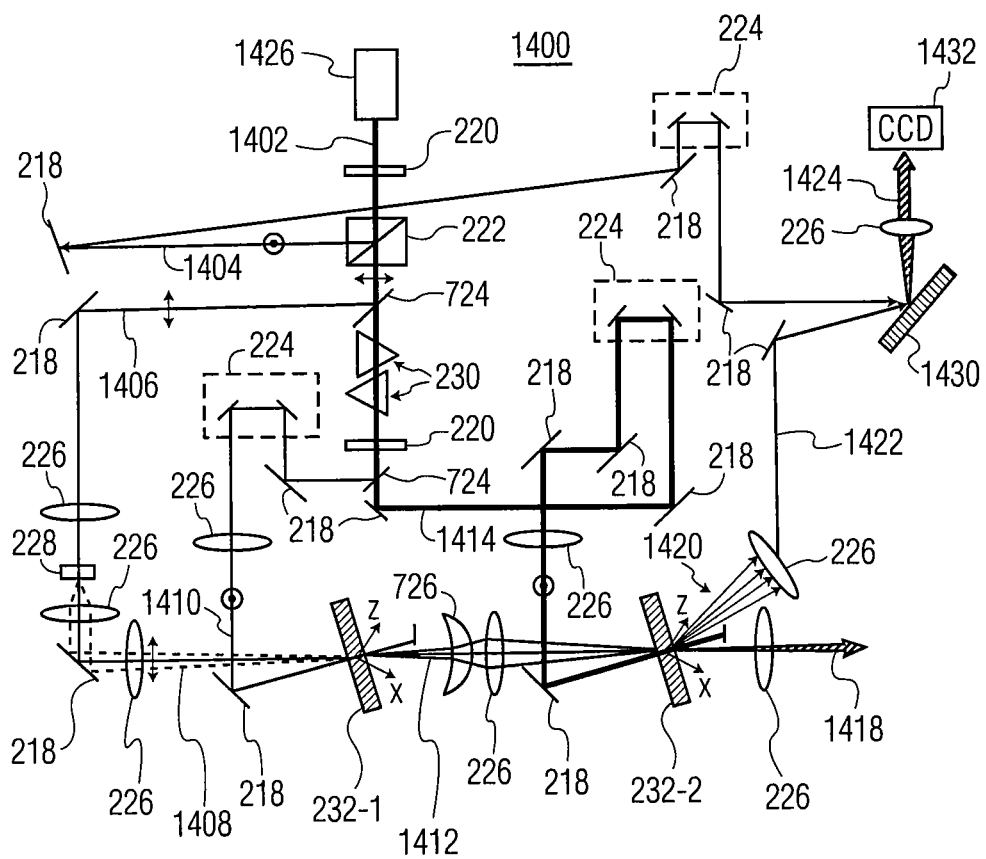
FIG. 14 is a block diagram illustrating an experimental setup for acquiring a broadband spectra of the idler beam, according to an embodiment of the present invention.

FIG. 14 is a block diagram illustrating a setup 1400 for acquiring broadband spectra of the idler beam 1420. The experimental setup produces a broadband idler 1420 from a two-crystal KTP-NOPA (similar to apparatus 700 in FIG. 7) with source 1426 and acquires a sum-frequency generation spectra of the idler with a CCD camera 1432. Source 1426 is the same as source 216 except that source 1426 provides pulses 1402 of about 550 µJ is contemplated that the idler spectra may also be acquired with an infrared spectrometer.

Sum-frequency generation (SFG) of the 800-nm pulses 1404 and broadband idler 1422 was used at the nonlinear polycrystalline ZnSe crystal 1430 to measure the SFG spectrum of the idler beam 1420 with a CCD-spectrometer in the visible spectrum (500-650 nm). The actual spectrum of the idler pulses was extracted from the SFG spectra by using the energy conservation relation: $\hbar \omega_{SFG} = \hbar \omega_{800nm} + \hbar \omega_{idler}$.

Figure 15:
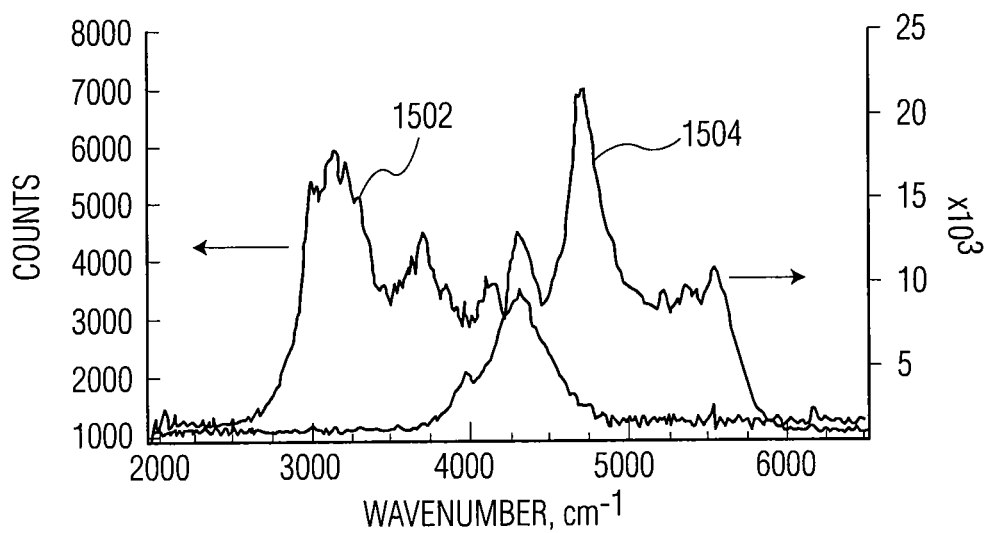
FIG. 15 is a graph illustrating a spectrum of the broadband idler obtained using the experimental setup shown in FIG. 14.

FIG. 15 presents preliminary data on spectra 1502, 1504 of the broadband idler obtained as described with respect to FIG. 14. The idler spectra 1502, 1504 were measured in separate regions (namely, closer to about 3000 cm⁻¹ edge, or closer to about 5000 cm⁻¹), whereas energy conservation between the pump, signal and idler pulses suggests that the idler may cover all of this band (about 3000-5000 cm⁻¹) simultaneously. Nevertheless, broadband generation was demonstrated at about 3000 nm with >1500 cm⁻¹ bandwidth.

Non-collinear optical parametric amplification can be also applied to the following nonlinear optical materials, listed in Table 1, to provide broadband mid-IR pulses.

TABLE 1

| Nonlinear Optical Crystal | Transparency Range |
|---|---|
| Ag₃AsS₃ | 0.6-13 µm |
| AgGaSe₂ | 0.71-18 µm |
| AgGaS₂ | 0.5-13 µm |
| Ag₃SbS₃ | 0.7-14 µm |
| CdSe | 7.5-20 µm |
| CdGeAs₂ | 2.4-18 µm |
| GaAs | 1.0-17 µm |
| HgGa₂S₄ | 0.5-13 µm |
| HgS | 0.63-13.5 µm |
| LiGaS₂ | 0.32-11.6 µm |
| LiGaSe₂ | 0.37-13.2 µm |
| LiInS₂ | 0.4-12 µm |
| Tl₃AsSe₃ | 1.25-20 µm |
| Te | 3.8-32 µm |
| ZnGeP₂ | 0.74-12 µm |

The crystals listed in Table 1 have extended transparency in the IR compared to previously described nonlinear optical crystals (e.g. KTP, KNB).

The crystals listed in Table 1 have found use as efficient generators of mid-IR pulses in about a 3-20 µm wavelength range via difference-frequency mixing (DFG) of the near- and/or mid-IR signal and/or idler pulses from optical parametric oscillators or amplifiers with such crystals as BBO, KTP, periodically-poled LNB etc.

The crystals described in Table 1 can also generate IR-pulsed radiation via an OPO/OPA process. The principle of optical parametric generation/amplification in these materials is essentially the same as for previously described nonlinear optical crystals, e.g. KTP, LNB, etc. The difference, however, is that one can no longer use 800-nm (or shorter wavelength) pulses as the pump because of increased two-photon absorption and resultant lower damage threshold at 800 nm.

Nevertheless, OPA in such materials is possible when pump pulses have longer wavelengths. A number of papers have been published on OPO/OPA in $AgGaS_2$, $AgGaSe_2$, $HgGa_2S_4$, $ZnGeP_2$ and other crystals from Table 1, with pump in the near- or mid-IR wavelength region (about 1.0-2.1 μm). As the pump wavelengths in these materials shift to about 1-2 μm, the signal pulses from OPO or OPA based on these crystals lie in about a 2-4 μm range, whereas the idler pulses lie in about a 4-20 μm range, depending on the pump wavelength and phase matching properties of each crystal.

Even though there is a considerable amount of literature on these materials, the possibility of non-collinear optical parametric amplification for production of broadband mid-IR pulses from these crystals, has not been fully explored. In particular, the methods described in the present invention have not been applied.

As suggested by calculations in SNLO software, non-collinear optical parametric amplification in these crystals can be realized with pump pulses with wavelengths in the range of about 1.1-2.2 μm (depending on the nonlinear optical crystal), resulting in generation of broadband IR-pulses at about 3.0-3.5 μm with bandwidths of, but not limited to, about 1000 nm (corresponding to about 1100 cm$^{-1}$ or larger bandwidths).

Figure 16A:
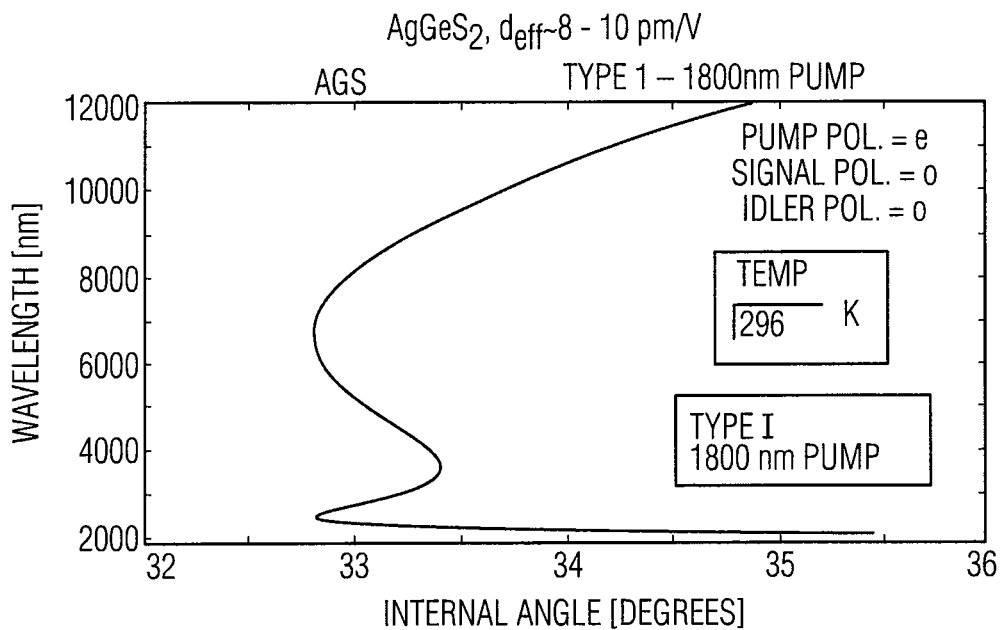
FIGS. 16A and 16B are graphs illustrating phase matching results for AgGaS$_2$.
Figure 16B:
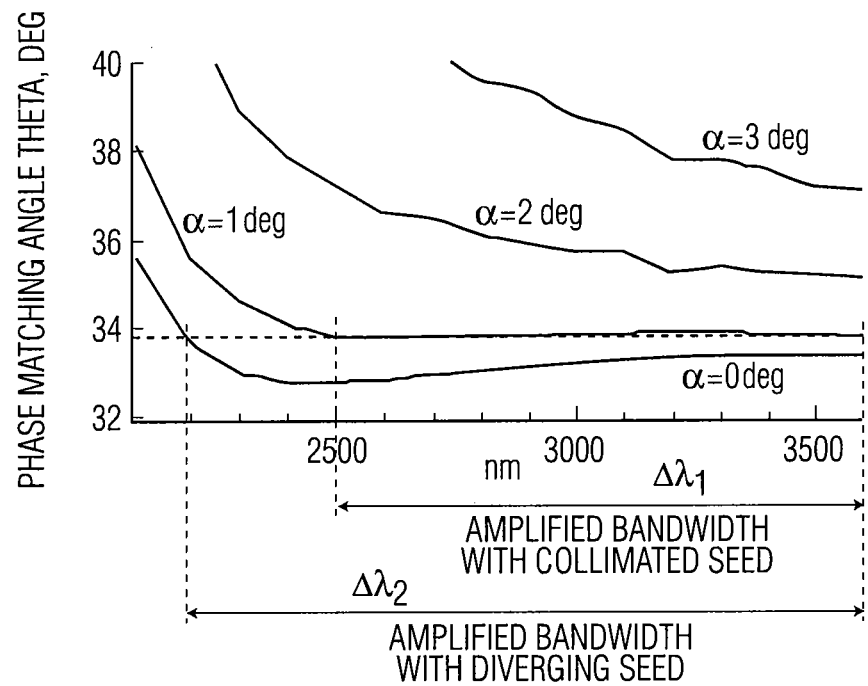
Figure 17A:
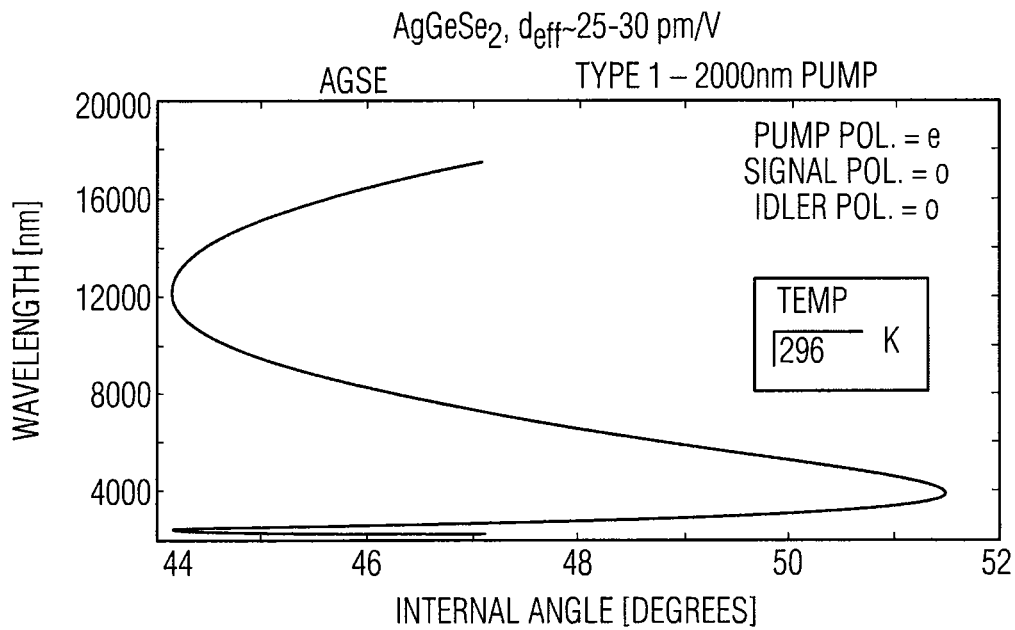
FIGS. 17A, 17B, 17C, and 17D are graphs illustrating phase matching results for several nonlinear optical crystals.
Figure 17B:
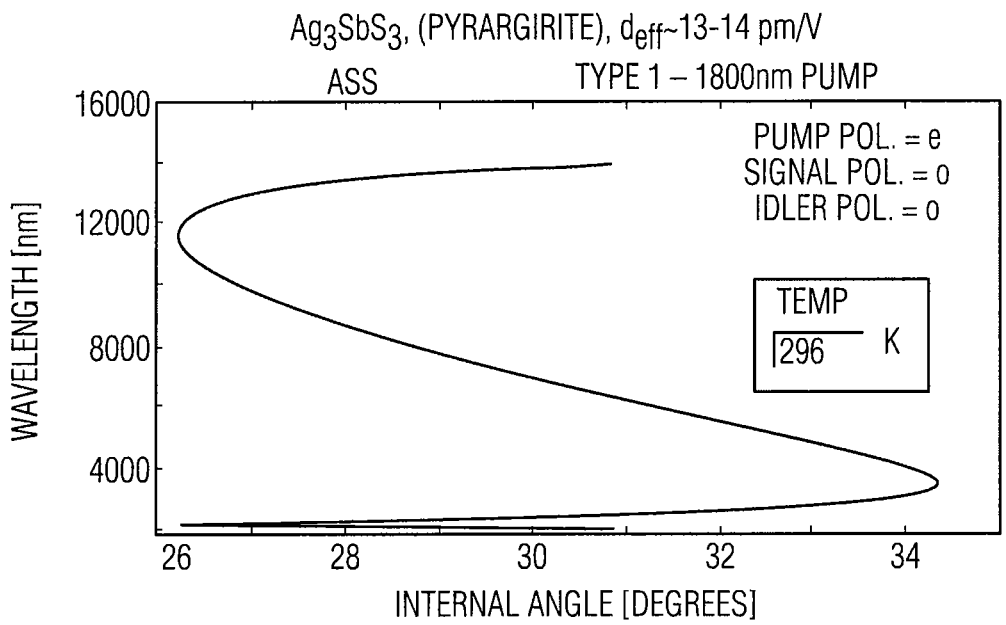
Figure 17C:
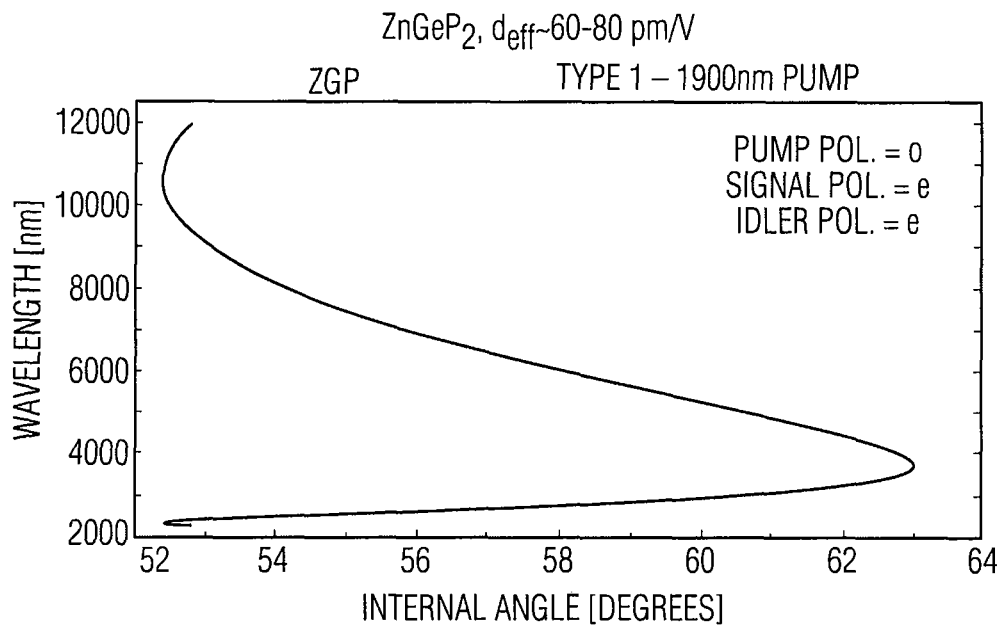
Figure 17D:
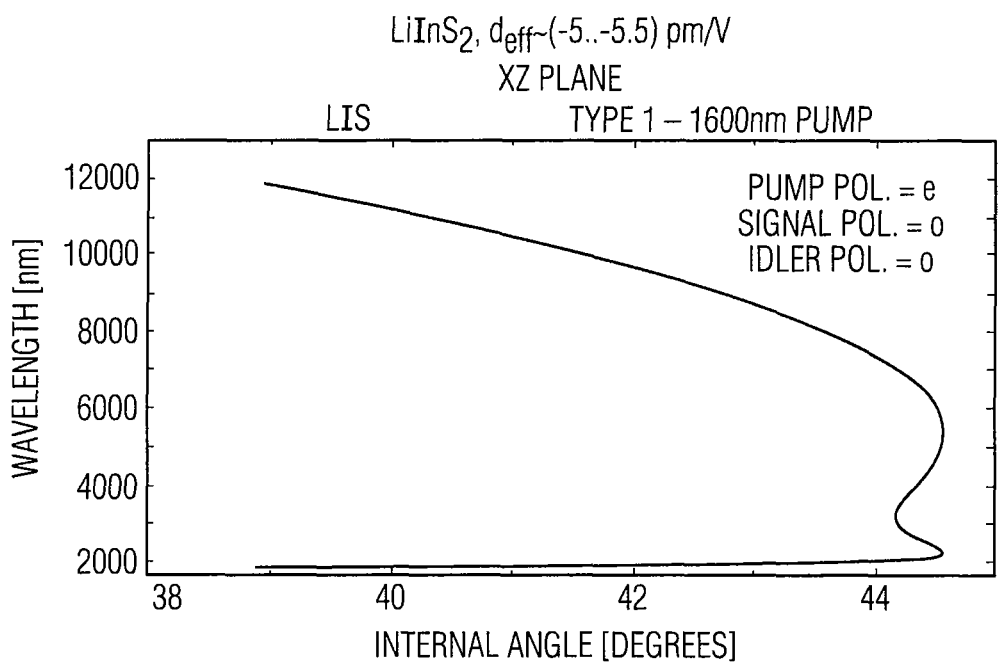

As an example, FIG. 16A shows the phase matching curve for the $AgGaS_2$ crystal, calculated in the SNLO software for the following conditions: collinear-geometry OPA; 1800-nm pump; type-I interaction: o-signal+o-idler=e-pump; and a temperature of 296K. The value of the effective nonlinearity coefficient ($d_{eff}$ (the value that determines the conversion efficiency of a certain parametric interaction scheme) ranges from 8 to 10 pm/V, which is a relatively high nonlinear coefficient. (A $d_{eff}$ of about 2-3 pm/V is zo obtained for the exemplary interaction scheme in KTP described herein). FIG. 16B shows the phase matching curves of the signal for the same crystal, $AgGaS_2$, for the same conditions, at varying values of the signal-pump non-collinear angle α. It can be seen that at α=1°, the signal pulses, if collimated, can be amplified in a broad range of wavelengths covering the range of wavelengths of about 2500-3600 nm (denoted as $\Delta\lambda_1$, "Amplified bandwidth with collimated seed"). FIG. 16B also suggests that if a diverging seed is used, the range of simultaneously amplified wavelengths can be extended to about 2200-3600 nm (denoted as $\Delta\lambda_2$, "Amplified bandwidth with diverging seed"). For the case when the collimated signal seed is used, the range of the corresponding idler wavelengths that are expected to be generated simultaneously (based on energy conservation), is about 6.4-3.6 μm (which corresponds to the wavenumber range of about 1500-2780 cm$^{-1}$). As calculations in SNLO suggest, the broadband non-collinear optical parametric amplification in the $AgGaS_2$ crystal is also possible at other pump wavelengths in the range of about 1050-2000 nm. A shift of the pump wavelength will cause a shift of amplified signal and idler wavelength ranges.

This approach is also applicable to other materials listed in Table 1. FIGS. 17A-17D show phase matching curves for several nonlinear optical crystals, calculated with the use of SNLO, at varying pump wavelengths (conditions are indicated for each graph separately). The corresponding nonlinear coefficients $d_{eff}$ retrieved from SNLO are also indicated. As can be seen, the shape of these phase matching curves resemble that for the $AgGaS_2$ crystal shown in FIG. 16A. This suggests that for each of cases shown in FIGS. 17A-17D there exists a value of the signal-pump non-collinear angle at which the signal will be amplified in a broad spectral range (e.g., about 2200-3900 nm for the $ZnGeP_2$ crystal).

The mid-IR continuum signal seed to be amplified in the described interaction scheme can be generated in a manner similar to how the near-IR white-light continuum signal seed is generated for a near-IR NOPA-scheme. A part of (intense) pump pulses centered at about 1.8-2.1 μm can be focused into a dense optical material that transmits in the mid-IR (e.g. sapphire; crystalline YAG etc.), and (weak) continuum is seed should be generated spanning over the mid-IR wavelength region.

The present invention may be used for generation of pulsed attosecond X-ray radiation via high-harmonic generation, coherent control of electron spin in semiconductors, ultrafast vibrational spectroscopy of the interfaces by nonlinear optical processes (e.g., sum-frequency generation, second-harmonic generation, four-wave mixing), two-dimensional IR spectroscopy with improved time-resolution, ultrafast bio-imaging with near-IR pulsed light radiation, broadband optical communication networks, coherent control of molecular vibrations, state-selective, laser driven chemistry.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for generation of tunable broadband pulsed radiation from a pulsed pump beam, comprising:
    generating a chirped white light beam from a first portion of the pulsed pump beam;
    directing the chirped white light beam to be divergent on a nonlinear optical crystal;
    applying a time delay to a second portion of the pulsed pump beam, the time delay corresponding to a tuning wavelength;
    generating the broadband pulsed radiation tuned to the tuning wavelength by passing the divergent beam and the time-delayed pulsed pump beam through the nonlinear optical crystal,
    wherein the directing the chirped white light beam includes focusing the chirped white light beam with a divergence angle selected to simultaneously capture a plurality of non-collinear angles between the divergent beam and the time-delayed pulsed pump beam in the nonlinear optical crystal.

2. A method according to claim 1, the generating the broadband pulsed radiation further comprising performing non-collinear optical parametric amplification (NOPA) in the nonlinear optical crystal.

3. A method according to claim 2, wherein the performing the NOPA includes performing a type II NOPA.

4. A method according to claim 1, directing the chirped white light beam further comprising collimating the chirped white light beam.

5. A method according to claim 1, wherein the wavelength of the broadband pulsed radiation corresponds to a portion of the chirped white light beam that overlaps with the time-delayed pulsed pump beam.

6. A method according to claim 1, wherein the tunable broadband pulsed radiation is produced in a near-infrared region of wavelengths.

7. A method according to claim 1, wherein the tunable broadband pulsed radiation is produced in a mid-infrared region of wavelengths.

8. A method for generation of broadband pulsed radiation from a pulsed pump beam, comprising:
generating a chirped white light beam from a first portion of the pulsed pump beam;
directing the chirped white light beam to be divergent on a nonlinear optical crystal;
applying a time delay to a second portion of the pulsed pump beam, to provide a temporal overlap between the second portion of the pulsed pump beam and the chirped white light beam; and
generating the broadband pulsed radiation by passing the divergent beam and the time-delayed pulsed pump beam through the nonlinear optical crystal,
wherein the directing the chirped white light beam includes focusing the chirped white light beam with a divergence angle selected to simultaneously capture a plurality of non-collinear angles between the divergent beam and the time-delayed pulsed pump beam to the nonlinear optical crystal.

9. A method according to claim 8, generating the broadband pulsed radiation further comprising performing non-collinear optical parametric amplification (NOPA) in the nonlinear optical crystal.

10. A method according to claim 9, wherein the performing the NOPA includes performing a type II NOPA.

11. A method according to claim 8, the generating the chirped white light beam including compressing the white light beam to optimize a temporal overlap between the time-delayed pulsed pump beam and the compressed beam,
wherein the compressed beam is directed to be divergent on the nonlinear optical crystal.

12. A method according to claim 8, further comprising, prior to generating the broadband pulsed radiation, stretching the second portion of the pulsed pump beam to optimize a temporal overlap between the stretched beam and the chirped white light beam,
wherein the stretched beam is directed to the nonlinear optical crystal.

13. A method according to claim 8, further comprising:
directing the broadband pulsed radiation to a further nonlinear optical crystal; and
generating an amplified broadband pulsed radiation by performing non-collinear optical parametric amplification (NOPA) in the further nonlinear optical crystal using the broadband pulsed radiation and a third portion of the pulsed pump beam.

14. A method according to claim 8, the directing the chirped white light beam further comprising collimating and focusing the chirped white light beam with at least one lens.

15. A method according to claim 8, the directing the chirped white light beam further comprising collimating and focusing the chirped white light beam with at least one curved mirror.

16. A method according to claim 8, further comprising detecting an idler beam produced from the nonlinear optical crystal responsive to the passing of the divergent beam and the time-delayed pulsed pump beam through the nonlinear optical crystal.

17. A method according to claim 8, wherein the broadband pulsed radiation is produced in a near-infrared region of wavelengths.

18. A method according to claim 8, wherein the broadband pulsed radiation is produced in a mid-infrared region of wavelengths.

19. A device for generating broadband pulsed radiation from a pulsed pump beam, comprising:
a generator that generates a divergent chirped white light beam from a first portion of the pulsed pump beam;
a time delay stage that applies a time delay to a second portion of the pulsed pump beam, to provide a temporal overlap between the second portion of the pulsed pump beam and the chirped white light beam; and
a nonlinear optical crystal configured to receive the divergent beam and the time-delayed pulsed pump beam;
wherein the broadband pulsed radiation is generated by passing the divergent beam and the time-delayed pulsed pump beam through the nonlinear optical crystal, and
wherein the generator generates a chirped white light beam from the first portion of the pulsed pump beam and focuses the chirped white light beam with a divergence angle selected to simultaneously capture a plurality of non-collinear angles between the divergent beam and the time-delayed pulsed pump beam in the nonlinear optical crystal.

20. A device according to claim 19, wherein the generation of the broadband pulsed radiation is based on non-collinear optical parametric amplification (NOPA) in the nonlinear optical crystal.

21. A device according to claim 20, wherein the generation of the broadband pulsed radiation is based on a type II NOPA.

22. A device according to claim 19, wherein the nonlinear optical crystal is selected from the group consisting of potassium-titanyl phosphate (KTP), $LiIO_3$, $LiTaO_3$, Potassium Titanyl Arsenate (KTA, $KTiOAsO_4$), Cesium Titanyl Arsenate (CTA, $CsTiOAsO_4$), Rubidium Titanyl Arsenate (RTA, $RbTiOAsO_4$), Rubidium Titanyl Phosphate (RTP, $RbTiOPO_4$), Potassium Aluminum Borate (KABO, $K_2Al_2B_2O_7$), Lithium Tetraborate (LB4, $Li_2B_4O_7$), and Yttrium Calcium Oxyborate (YCOB, $YCa_4O(BO_3)_3$), $Ag_3AsS_3$, $AgGaSe_2$, $AgGaS_2$, $Ag_3SbS_3$, CdSe, $CdGeAs_2$, GaAs, $HgGa_2S_4$, HgS, $LiGaS_2$, $LiGaSe_2$, $LiInS_2$, $Tl_3AsSe_3$, Te, and $ZnGeP_2$.

23. A device according to claim 19, wherein the nonlinear optical crystal is a bulk optical crystal.

24. A device according to claim 19, further comprising a pulse stretcher for stretching the second portion of the pulsed pump beam,
wherein the stretched beam is received by the nonlinear optical crystal.

25. A device according to claim 19, further comprising at least one chirped mirror for compressing the divergent beam,
wherein the compressed beam is received by the nonlinear optical crystal.

26. A device according to claim 19, further comprising at least one lens for collimating and focusing the divergent beam onto the nonlinear optical crystal.

27. A device according to claim 19, further comprising at least one curved mirror for collimating and focusing the divergent beam onto the nonlinear optical crystal.

28. A device according to claim 19, further comprising:
a further nonlinear optical crystal configured to receive the broadband pulsed radiation and a third portion of the pulsed pump beam,
wherein an amplified broadband pulsed radiation is generated by passing the broadband pulsed radiation and the pulsed pump beam through the further nonlinear crystal.

29. A device according to claim 19, wherein:
the time delay stage is configured to apply the time delay to the second portion of the pulsed pump beam corresponding to a tuning wavelength,
wherein the broadband pulsed radiation is tuned to the tuning wavelength by passing the divergent beam and the time-delayed pulsed pump beam through the nonlinear optical crystal.

* * * * *